US011286064B2

(12) United States Patent
Griffin et al.

(10) Patent No.: US 11,286,064 B2
(45) Date of Patent: Mar. 29, 2022

(54) SINGLE-PERSON SPACECRAFT

(71) Applicant: Genesis Engineering Solutions, Inc., Lanham, MD (US)

(72) Inventors: Brand Griffin, Huntsville, AL (US); Robert Rashford, Gaithersburg, MD (US); Josh Lutter, Germantown, MD (US); Caleb Woo, Clarksville, MD (US); Sam Gaylin, Silver Spring, MD (US); Robert Bousquet, Perry Hall, MD (US); Mark Klappenberger, Crownsville, MD (US); Mark Belz, Bowie, MD (US); Dave Harvey, Gaithersburg, MD (US); Erin Wolf, Broomfield, CO (US); Matthew Stephens, Crofton, MD (US); Dylan Bell, College Park, MD (US)

(73) Assignee: GENESIS ENGINEERING SOLUTIONS, INC., Lanham, MD (US)

( * ) Notice: Subject to any disclaimer, the term of this patent is extended or adjusted under 35 U.S.C. 154(b) by 374 days.

(21) Appl. No.: 16/281,893

(22) Filed: Feb. 21, 2019

(65) Prior Publication Data
US 2019/0256229 A1 Aug. 22, 2019

Related U.S. Application Data

(60) Provisional application No. 62/633,479, filed on Feb. 21, 2018.

(51) Int. Cl.
*B64G 1/60* (2006.01)
*B64G 1/64* (2006.01)
*B64G 1/12* (2006.01)
*B64G 1/48* (2006.01)
*B64G 4/00* (2006.01)

(52) U.S. Cl.
CPC ............... *B64G 1/60* (2013.01); *B64G 1/12* (2013.01); *B64G 1/48* (2013.01); *B64G 1/646* (2013.01); *B64G 4/00* (2013.01)

(58) Field of Classification Search
CPC . B64G 1/60; B64G 1/646; B64G 1/12; B64G 4/00; B64G 1/48; B64G 6/00
See application file for complete search history.

(56) References Cited

U.S. PATENT DOCUMENTS

| 3,073,040 | A | * | 1/1963 | Schueller | B64G 1/12 244/171.9 |
| 3,137,290 | A | * | 6/1964 | Gongwer | B64G 6/00 600/19 |
| 3,537,668 | A | * | 11/1970 | Kosmo | B64G 1/12 244/171.9 |

(Continued)

OTHER PUBLICATIONS

Griffin, Brand N., Benefits of a Single-Person Spacecraft for Weightless Operations, American Institute of Aeronautics and Astronautics, 42nd International Conference on Environmental Systems, Jul. 15-19, 2012, pp. 1-16, San Diego, California.
Martin Marietta Aerospace, Manned Maneuvering Unit (MMU) Space Shuttle Program, Operational Data Book, Jul. 1985, pp. 1-348.
Dillon, Paul; Thomas, Gretchen; Oliver, Joe; and Zapata, Felipe, Flexible Packaging Concept for a Space Suit Portable Life Support Subsystem, SAE International, Jan. 2009, pp. 1-12.

(Continued)

*Primary Examiner* — Richard R. Green
(74) *Attorney, Agent, or Firm* — Welsh Flaxman & Gitler LLC

(57) ABSTRACT

A single-person spacecraft includes a pressurized crew enclosure, an external equipment bay, and an overhead crown assembly.

14 Claims, 14 Drawing Sheets

(56) References Cited

U.S. PATENT DOCUMENTS

| | | | | | |
|---|---|---|---|---|---|
| 4,828,207 | A * | 5/1989 | Haynes | B64G 1/14 244/171.7 |
| 4,842,224 | A * | 6/1989 | Cohen | B64G 1/12 244/171.9 |
| 5,042,173 | A * | 8/1991 | Blizzard | B64G 1/60 36/1 |
| 5,115,341 | A * | 5/1992 | Bentley | B64D 11/00 359/488.01 |
| 5,127,131 | A * | 7/1992 | Corrigan | B64G 1/641 16/422 |
| 6,216,984 | B1 * | 4/2001 | Brinsmade | B64G 1/12 244/159.4 |
| 6,866,232 | B1 * | 3/2005 | Finney | B64G 1/242 244/172.4 |
| 2008/0052051 | A1 * | 2/2008 | MacCallum | B64G 7/00 703/6 |
| 2015/0053823 | A1 * | 2/2015 | Bigelow | B64G 1/425 244/172.4 |
| 2017/0284751 | A1 * | 10/2017 | Noyes | B64G 1/60 |
| 2018/0208319 | A1 * | 7/2018 | McCarley | B64G 1/62 |
| 2019/0023428 | A1 * | 1/2019 | Veselka | B64G 1/60 |

OTHER PUBLICATIONS

Griffin, Brand N., and Dischinger, Charles, Low Cost Space Demonstration for a Single-Person Spacecraft, American Institute of Aeronautics and Astronautics, 41st International Conference on Environmental Systems, Jul. 17-21, 2011, pp. 1-9, Portland, Oregon.

Griffin, Brand; Rashford, Robert; Stephens, Matthew; Gaylin Samuel; Woo, Caleb; Lutter, Joshua; and Harvey, David, Single-Person Spacecraft Favored for Gateway EVA, 2018 AIAA Space and Astronautics Forum and Exposition, Sep. 17-19, 2018, pp. 1-26, Orlando, Florida.

Griffin, Brand; Rashford, Robert; Lutter, Joshua; Woo, Caleb; Gaylin Samuel; Bousquet Robert; Klappenberger, Mark; Bfi 7, Mark; Harvey, David; Wolf, Erin; Stephens, Matthew; and Finger, Barry, Single-Person Spacecraft Progress toward Flight Testing, AIAA Space and Astronautics Forum and Exposition, Sep. 12-14, 2017, pp. 1-16, Orlando, Florida.

Martin Marietta Aerospace, Manned Maneuvering Unit (MMU) Space Shuttle Program, Operational Data Book, Feb. 1979, pp. 1-74.

* cited by examiner

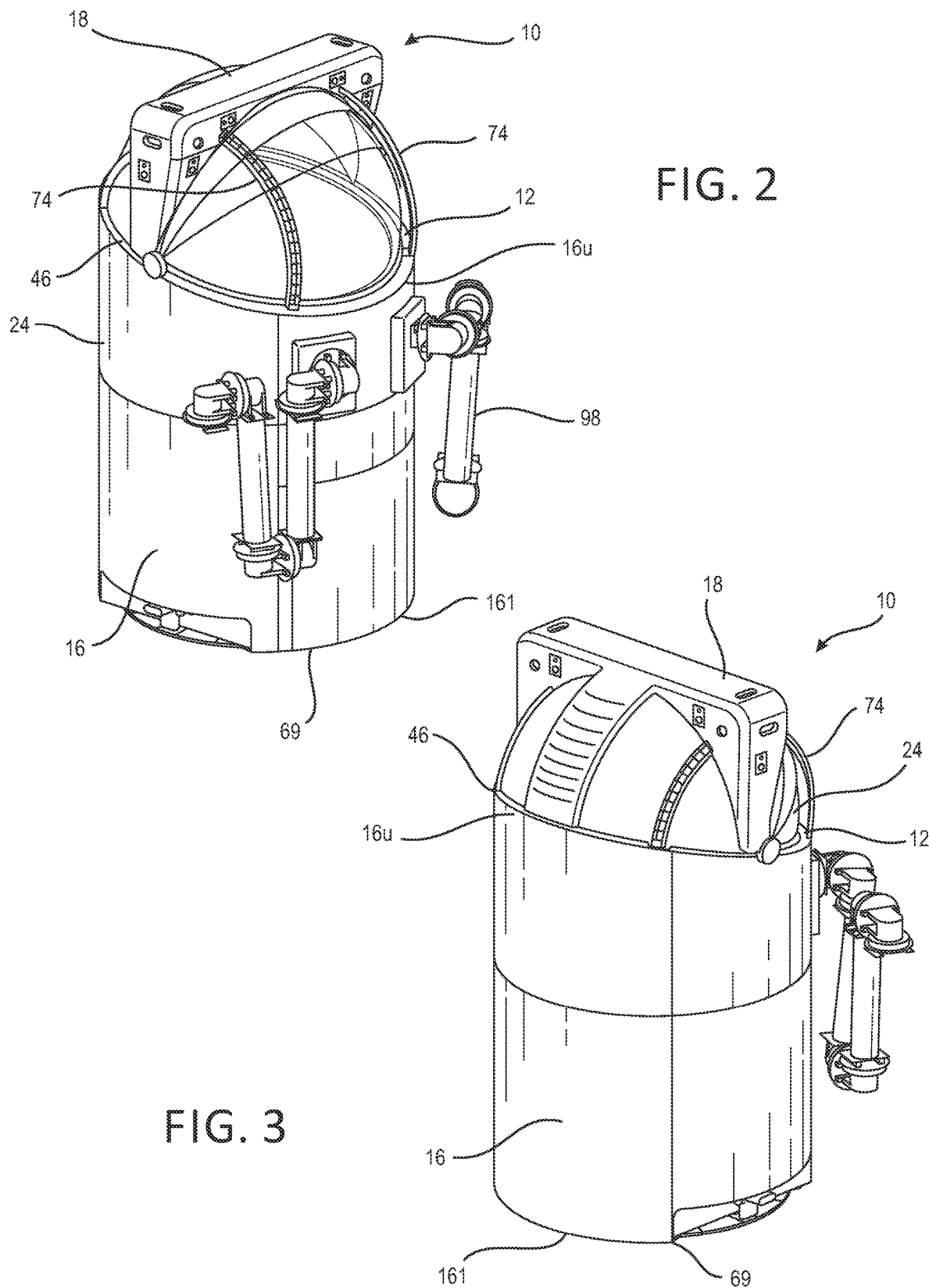

SINGLE-PERSON SPACECRAFT

CROSS REFERENCE TO RELATED APPLICATION

This application claims the benefit of U.S. Provisional Patent Application No. 62/633,479, entitled "SINGLE-PERSON SPACECRAFT," filed Feb. 21, 2018.

BACKGROUND OF THE INVENTION

1. Field of the Invention

The invention relates to single-person spacecrafts.

2. Description of the Related Art

Someday, astronauts will have safe, any-time access to space without the risk of the "bends" or need of an airlock. With recent progress in the development of the single-person spacecraft, "someday" could be very soon. This will be a welcomed improvement, and will be useful for servicing the aging International Space Station, satellites, telescopes, habitats, the Deep Space Gateway, and Mars mission vehicles. Today, it takes a long time for suited astronauts to get to a worksite but with a single-person spacecraft there is no lengthy pre-breathe, depressurizing an airlock, or hand-over-hand translation. Instead, astronauts fly directly to the site spending more time on the job rather than in preparation or translating back and forth. Furthermore, the single-person spacecraft is designed for crew autonomy providing an information-rich cockpit with displays and controls to assist with infrequent and unplanned tasks.

Concepts for a single-person spacecraft can be traced to Werner vonBraun's space bottle (See FIG. 1) and until now, few have progressed beyond preliminary design.

SUMMARY OF THE INVENTION

It is, therefore, an object of the present invention to provide a single-person spacecraft including a pressurized crew enclosure, an external equipment bay, and an overhead crown assembly.

It is also an object of the present invention to provide a single person spacecraft including a shielding skin, wherein space between the shielding skin and the pressurized crew enclosure defines the external equipment bay which is an unpressurized annular volume within which various subsystems of the single-person spacecraft are housed.

It is another object of the present invention to provide a pressurized single person spacecraft including a berthing/docking mechanism and a hatch.

It is a further object of the present invention to provide a single person spacecraft wherein the pressurized crew enclosure is composed of a welded aluminum structure and a clear hemispheric canopy.

It is also an object of the present invention to provide a single person spacecraft wherein the pressurized crew enclosure includes a large diameter upper enclosure member allowing astronaut arm movement and a smaller diameter lower enclosure member for foot restraint and crew translation into and out of the pressurized crew enclosure.

It is another object of the present invention to provide a single person spacecraft wherein the pressurized crew enclosure includes a first horizontal translation bar and within the upper enclosure member and first and second vertical translation bars within the lower enclosure member.

It is a further object of the present invention to provide a single person spacecraft including foot restraint adjustably mounted on the first and second vertical translation bars within the lower enclosure member of the pressurized crew enclosure in a manner allowing for up and down movement along the first and second vertical translation bars relative to the upper enclosure member so to allow for proper positioning of astronauts of various sizes within the pressurized crew enclosure.

It is also an object of the present invention to provide a single person spacecraft wherein the clear hemispheric canopy includes a sun visor, an opaque shade, and a protective shield.

It is another object of the present invention to provide a single person spacecraft wherein the upper enclosure member is secured to the lower enclosure member via a frustum sheet metal section extending between a lower edge of the upper enclosure member and an upper edge of the lower enclosure member.

It is a further object of the present invention to provide a single person spacecraft wherein feedthrough plates are formed along the frustum sheet metal section and provide access points for communicating between the pressurized crew enclosure and the external equipment bay.

It is also an object of the present invention to provide a single person spacecraft wherein the pressurized crew enclosure is supported by panel longerons providing primary load path for loads applied to the single-person spacecraft.

It is another object of the present invention to provide a single person spacecraft further including thrusters, propellant tanks, batteries, and a multifunctional tool drawer are all connected to, and stabilized by the panel longerons.

It is a further object of the present invention to provide a single person spacecraft wherein the crown assembly is secured to structural rails that arch over the pressurized crew enclosure.

It is also an object of the present invention to provide a single person spacecraft wherein the crown assembly supports propulsion thrusters, lights and cameras.

It is another object of the present invention to provide a single person spacecraft including a data processing system providing for flight control, robotics operation and processing relevant to an air management system.

It is a further object of the present invention to provide a single person spacecraft including an astronaut service panel within the pressurized crew enclosure.

It is also an object of the present invention to provide a single person spacecraft wherein the service panel includes inputs/outputs for servicing oxygen recharge, nitrogen recharge, water recharge, nitrox recharge, power recharge, data output, and inlet filter.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 2 is a front perspective view of a single-person spacecraft in accordance with the present invention.

FIG. 3 is a rear perspective view of a single person spacecraft in accordance with the present invention.

DESCRIPTION OF THE PREFERRED EMBODIMENTS

Figure 1:
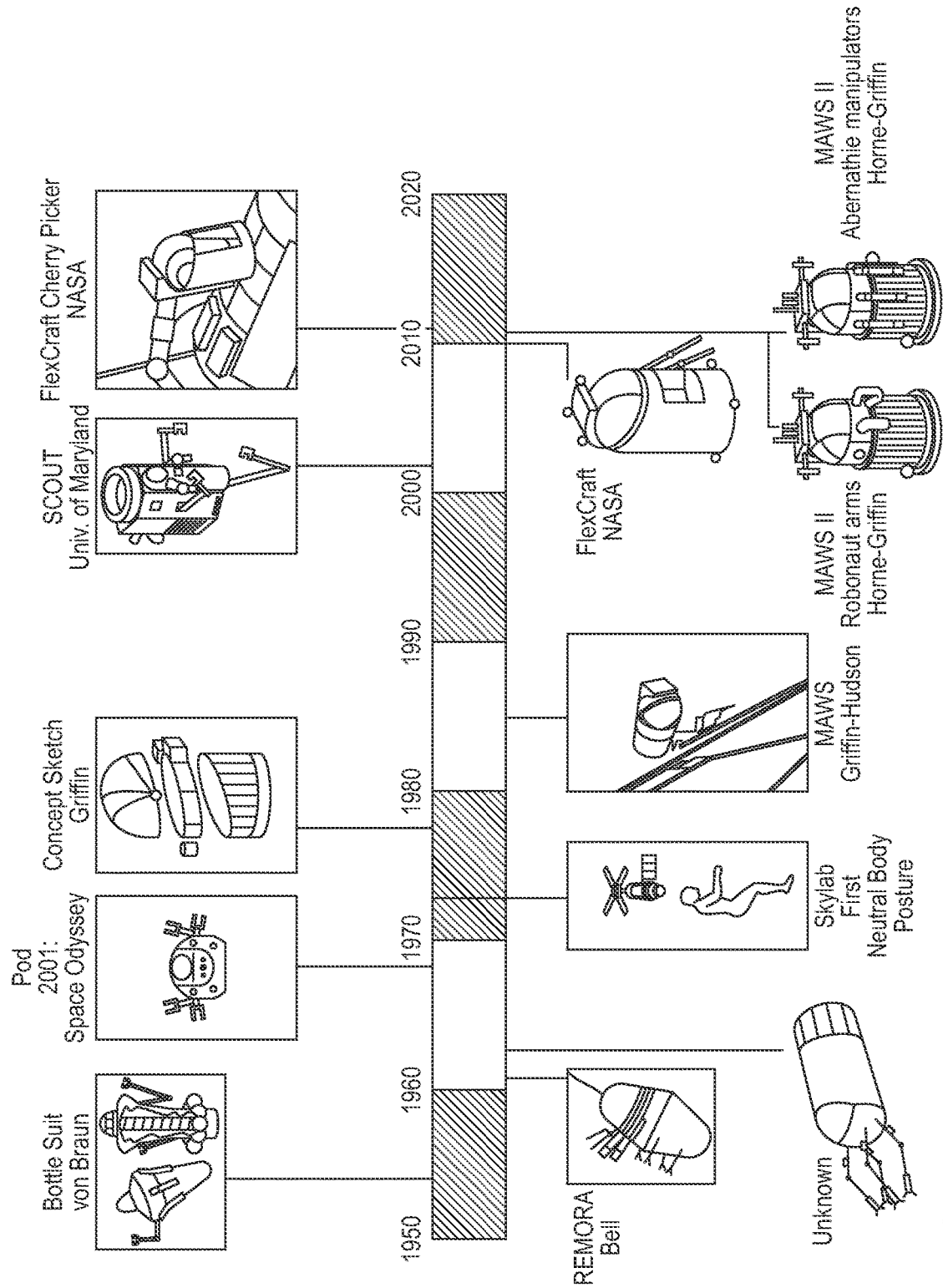
FIG. 1 is an illustration showing developments in single-person spacecraft development.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to the various figures, the single-person spacecraft 10 in accordance with the present invention is composed of a pressurized crew enclosure 12, an external equipment bay 14 bounded by a Micrometeoroid/Orbital Debris (MMOD) shielding skin 16, and an overhead crown assembly 18. The bottom of the single-person spacecraft 10 contains a berthing/docking mechanism 20 and hatch 22 for crew translation ingress and egress.

The single-person spacecraft 10 of the present invention provides external operations for a broad range of tasks including the inspection and servicing of the International Space Station, telescopes, satellites, habitats, as well as exploration of low gravity moons such as Phobos. The single-person spacecraft 10 can be piloted or tele-operated and, because the pressure within the single-person spacecraft 10 is the same as the host vehicle, it allows immediate access to space without the need for prebreathing to purge astronaut's bodies of nitrogen or an airlock. The propulsion system 100 of the single-person spacecraft 10 allows the crew to get to and spend more time at the worksite rather than translating back and forth between the host vehicle and the worksite. Sized for the full astronaut population, the single-person spacecraft 10 provides a shirt sleeve, cockpit-type environment complete with the displays and controls necessary for flight operations and task management. The single-person spacecraft 10 is with equipped with lights, cameras, and interchangeable manipulators for sample collection and dexterous servicing of the International Space Station, telescopes, satellites, and habitats.

Considering now the details of the single-person spacecraft 10, the pressurized crew enclosure 12 represents the habitable volume of the single-person spacecraft 10. It is a complete assembly primarily composed of a welded aluminum structure and a clear polycarbonate canopy 24 that acts as the primary viewport of the single-person spacecraft 10. As will be appreciated based upon the following disclosure, the crew enclosure 12 of the present invention is far less expensive to construct than prior space enclosures due to the choice of materials and the structural elements integrated into the construction thereof.

The pressurized crew enclosure 12 is composed of the clear hemispheric canopy 24 providing broad field of view, a large diameter upper enclosure member 26 allowing astronaut arm movement, and a smaller diameter lower enclosure member 28 for foot restraint and crew translation into and out of the crew enclosure 12. Because single-person spacecraft 10 operations are more like a helicopter than a commercial airliner, the large canopy 24 is ideal for moving the head to improve line-of-sight visibility. The crew enclosure 12 of the single-person spacecraft 10 is designed around the weightless neutral body posture and is sized to accommodate the entire astronaut population.

In accordance with the disclosed embodiment, the clear hemispheric canopy 24 is composed of polycarbonate. The clear hemispheric canopy 24 is structured to provide clarity of vision as well as protection from the external environments, while also covering the entirety of the upper portion of the crew enclosure to provide the crew member with a wide view and protected environment. The clear hemispheric canopy 24 is secured to the upper enclosure member 26 of the single-person spacecraft 10 by a clamping bracket 44 that draws the open edge 46 of the clear hemispheric canopy 24 into contact with the upper edge 48 of the upper enclosure member 26. An O-ring seal 50 is positioned between the open edge 46 of the clear hemispheric canopy 24 and the upper edge 48 of the upper enclosure member 26. The clear hemispheric canopy 24 also includes a sun visor 52, an opaque shade 53, and a protective shield 54. The sun visor 52, the opaque shade 53, and the protective shield 54 are shaped and dimensioned to conform to the outer surface of the clear hemispheric canopy 24 and to move relative thereto such that the astronaut may selectively move the desired component into position. As such, the sun visor 52, the opaque shade 53, and the protective shield 54 are radially oriented to sit over each other and to move under the crown 18. The edges of the sun visor 52, the opaque shade 53, and the protective shield 54 mounted to pivot points at the junction of the clear hemispheric canopy 24 and the upper edge 48 of the upper enclosure member 26. It is appreciated movement of the sun visor 52, the opaque shade 53, and the protective shield 54 may be achieved via motorized techniques or manual controls.

Figure 5:
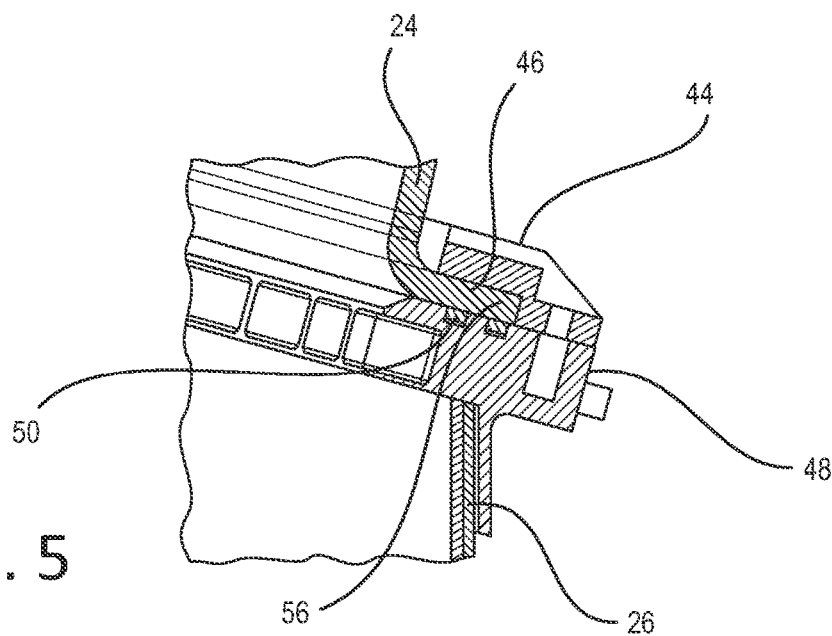
FIG. 5 is a detailed view showing attachment of the canopy to the large diameter upper enclosure member.
Figure 6:
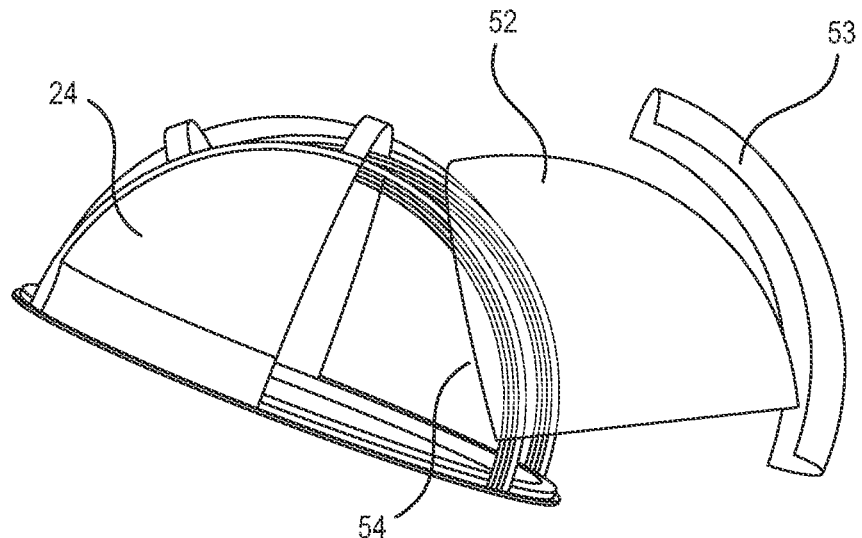
FIG. 6 is a perspective view showing the sun visor, opaque shade, and protective shield in conjunction with the canopy.
Figure 7:
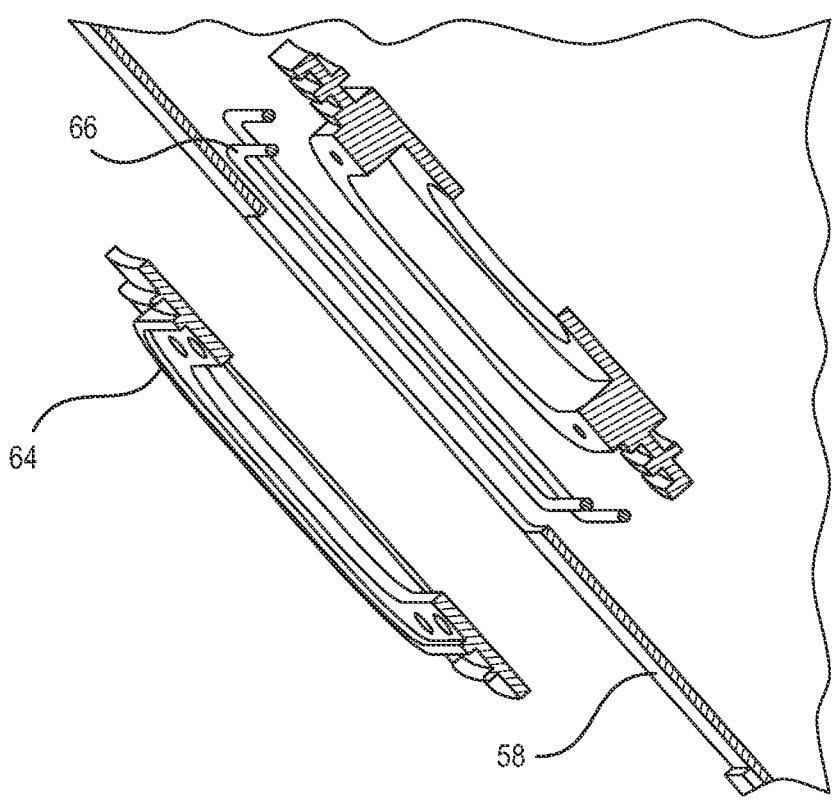
FIG. 7 is an exploded view of the feedthrough plates utilized in conjunction with the frustum sheet metal section.
Figure 8:
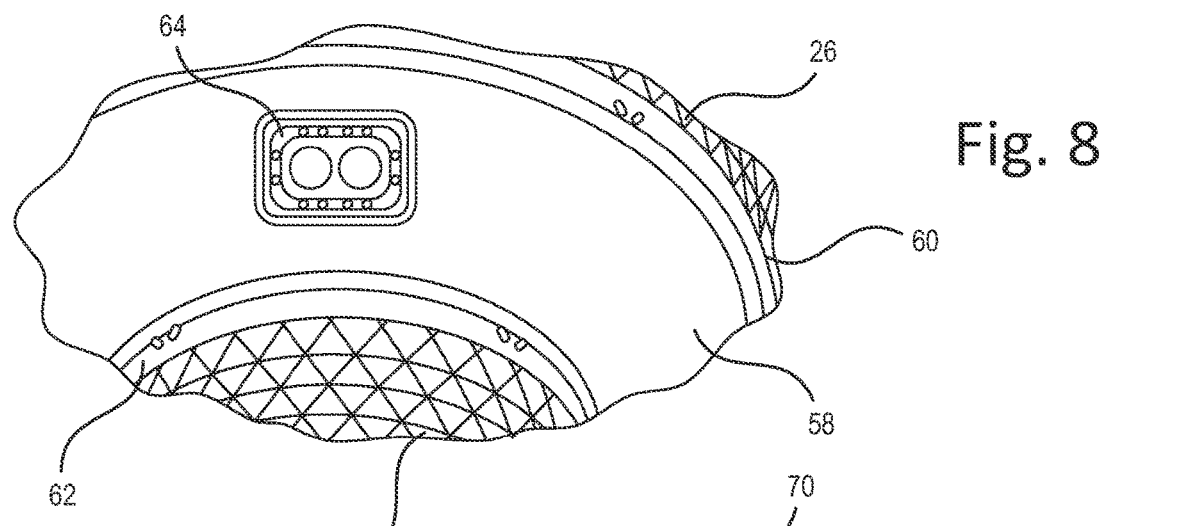
FIG. 8 is an exterior perspective view of the feedthrough plates utilized in conjunction with the frustum sheet metal section.
Figure 9:
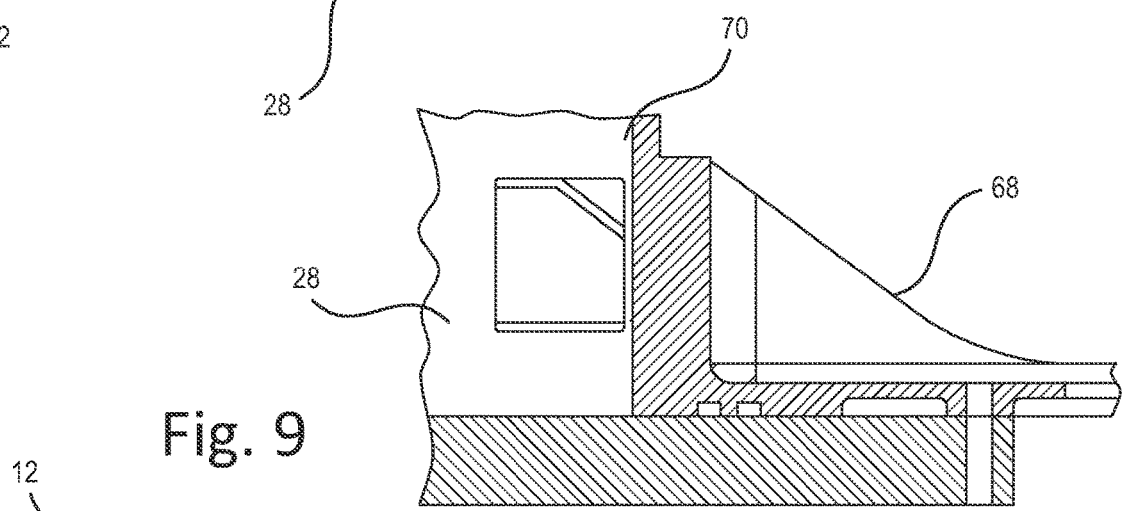
FIG. 9 is a detailed cross sectional view of the hatch bulk head ring.
Figure 10:
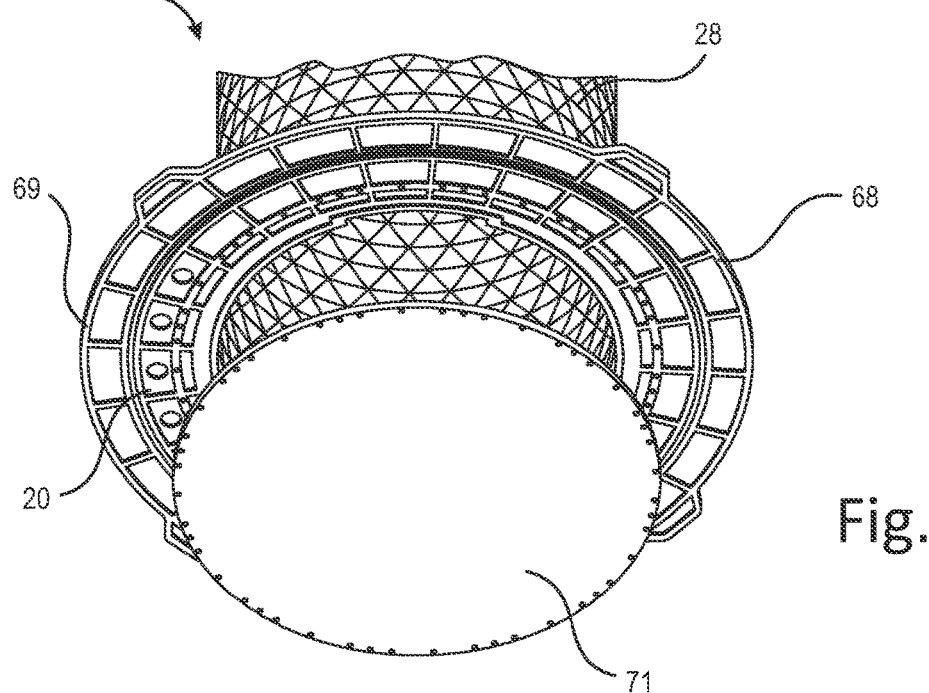
FIG. 10 is a perspective view of the hatch bulk head ring with a hatch cover plate positioned there beneath.
Figure 11:
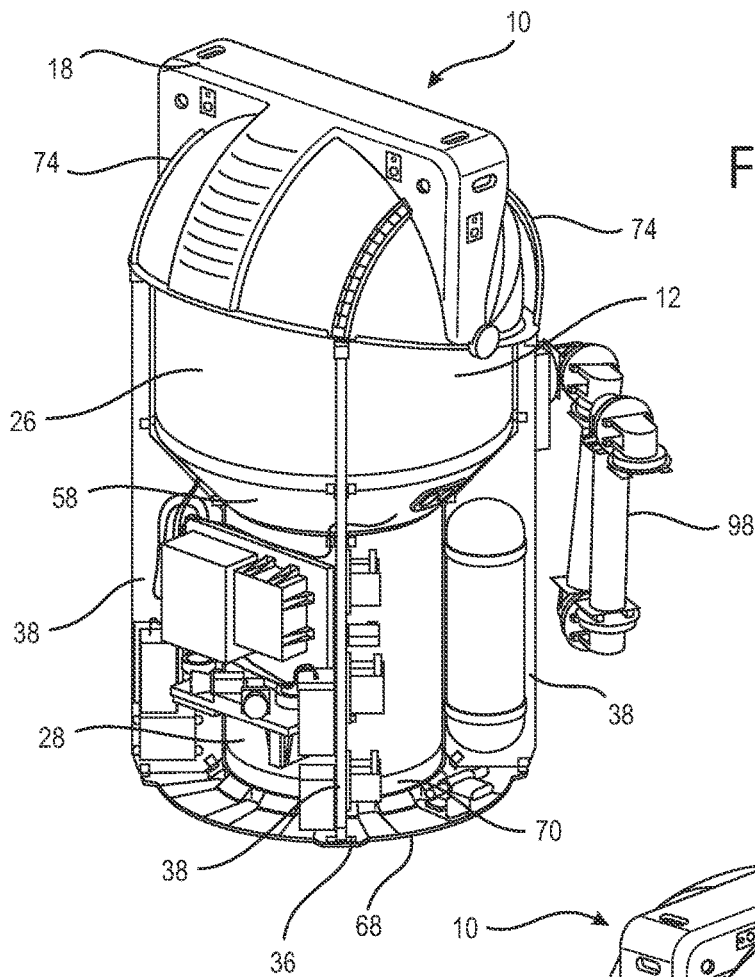
FIG. 11 is a rear perspective view of the single-person spacecraft with the outer layer removed.
Figure 12:
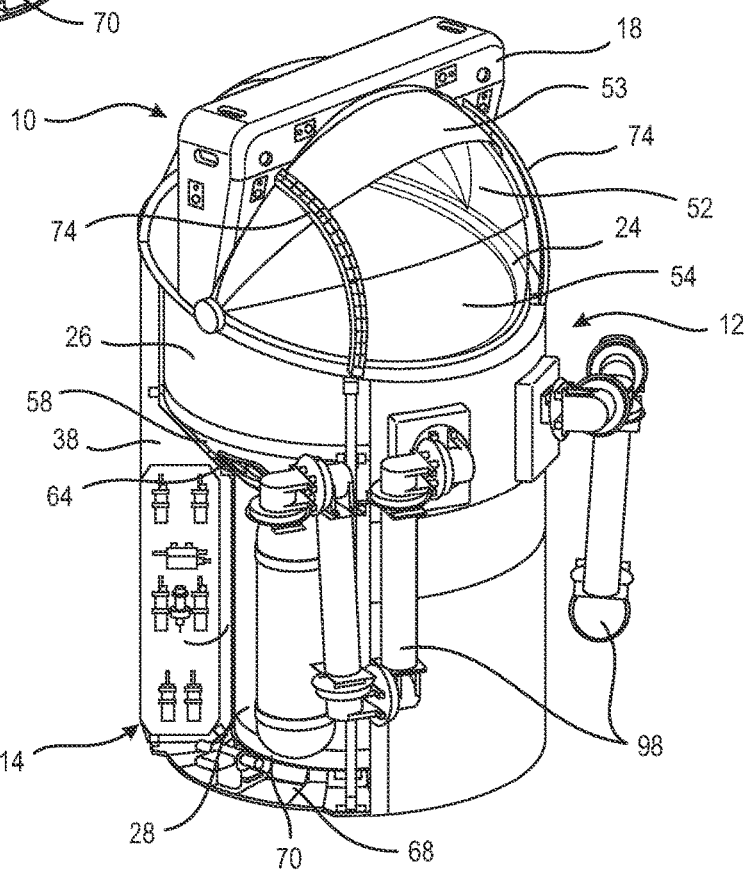
FIG. 12 is a front perspective view of the single person spacecraft with a portion of the outer layer removed.

In particular, and with reference to FIG. 5, the clamping bracket 44 secures the flange 56 of the clear hemispheric canopy 24 onto the sealing face of the O-ring seal 50 at the upper edge 48 of the upper enclosure member 26. The clamping bracket 44 provides compression to the O-ring seal 50 spread about the full circumference of the upper edge 48 so as not to introduce point loads. The clamping bracket 44 is segmented to allow for integration.

The upper enclosure member 26 is secured to the lower enclosure member 28 via a frustum sheet metal section 58 extending between the lower edge 60 of the upper enclosure member 26 and the upper edge 62 of the lower enclosure member 28. Feedthrough plates 64 are formed along the frustum sheet metal section 58 and provide access points for communicating between the interior (or cabin) of the crew enclosure 12 and the external equipment bay 14. The feedthrough plates 64 provide a flat surface to install electrical and fluid bulkhead connectors. The feedthrough plates 64, however, do not allow for an astronaut within the crew enclosure 12 to access the external equipment bay 14. In fact, the external equipment bay 14 is not accessible by an astronaut using the present single person spacecraft 10. It is, however, contemplated the feedthrough plates may not be necessary and other mechanisms for connecting the interior of the crew enclosure with the external equipment bay.

A hatch bulkhead ring 68 is secured along the lower edge 70 of the lower enclosure member 28 to thereby enclose the lower portion of the pressurized crew enclosure 12. A hatch cover plate 71 is provided for selective attachment to the hatch bulkhead ring 68. The hatch cover plate 71 is not used in operation but facilitates pressure testing of the crew enclosure 12, and validates the O-ring seals of the crew enclosure 12. The hatch cover plate 71 will include handles for transport, and a leak check port for the O-ring seal.

As briefly mentioned above, the upper enclosure member 26, the lower enclosure member 28, the frustum sheet metal section 58, and other structural components making up the wall of the pressurized crew enclosure 12 along these sections are composed of welded aluminum. In particular, welded 2219 aluminum is used as this provides the strength and stability required in accordance with the present invention.

The crew enclosure 12, in particular, the upper enclosure member 26 and the lower enclosure member 28 of the crew enclosure 12 are surrounded by the MMOD shielding skin 16. The space between the shielding skin 16 and the crew enclosure 12 defines the external equipment bay 14 which is an unpressurized annular volume within which various subsystems of the single-person spacecraft 10 are housed. The upper edge 16u of the shielding skin 16 is secured to the crew enclosure 12 at the open edge 46 of the canopy 24 and the lower edge 16l of the shielding skin 16 is secured to the outer edge 69 of the hatch bulkhead ring 68 at the bottom of the crew enclosure 12. Because the lower enclosure member 28 has a smaller diameter than the upper enclosure member 26, and the shielding skin 16 has constant diameter as it extends downwardly from the junction with the upper enclosure member 26, an annular space defining the external equipment bay 14 is provided. The shielding skin 16, as well as the crew enclosure 12 and other structural elements of the single-person spacecraft 10 are supported by four honeycomb panel longerons 38 that provide the primary load path for all loads applied to the single-person spacecraft 10. For example, high loads (for example, resulting from launch) are diverted away from crew enclosure 12 and into the panel longerons 38 of the single-person spacecraft 10. Thrusters 30, propellant tanks 32, batteries 34, and a multifunctional tool drawer 36 are all connected to, and stabilized by the four radial longerons 38. It is, however, appreciated that additional stiffening members may be added to the structure of the single-person spacecraft 10 as needed.

In addition to providing for structural stability through the integration of the four honeycomb panel longerons 38, the shielding skin 16 offers a layered structure between the external environment and the crew enclosure 12 to provide initial energy dispersion. The shielding skin 16 offers thermal advantages by maintaining room temperature in the crew enclosure 12, decreases the risk of astronaut exposure to radiation, and reduces the penetration of atomic oxygen into various subsystems of the single-person spacecraft 10.

As the name implies, the crown assembly 18 sits on top of the single-person spacecraft 10 and is secured to structural rails 74 that arch over the pressurized canopy 24. The crown assembly 18 is arc shaped and extends from one lateral side of the pressurized canopy 24, across the apex of the pressurized canopy 24, and to the other lateral side of the pressurized canopy 24. As such, the crown assembly 18 is positioned substantially atop, and at the apex of, the pressurized canopy 24. The crown assembly 18 serves as the support structure for the upper propulsion thrusters 30, is an enclosure for avionics components, and has lights 40 and cameras 42 attached to the forward face 18f thereof. The crown assembly 18 also includes navigation and communication antennae. As disclosed herein, various functional and structural components of the single person spacecraft 10 are integrated into the crown assembly 18, for example, lights, thrusters, cameras. The specific positioning of these functional and structural components may be varied depending upon specific needs of the final single person spacecraft 10.

The single-person spacecraft 10 structure has been designed for launch loads, retaining cabin atmosphere, inadvertent contact, berthing/docking impact, and micro-meteoroid/debris protection. As described above, the major structural elements are the crew enclosure 12, external equipment bay 14, and the crown assembly 18.

Figure 4:
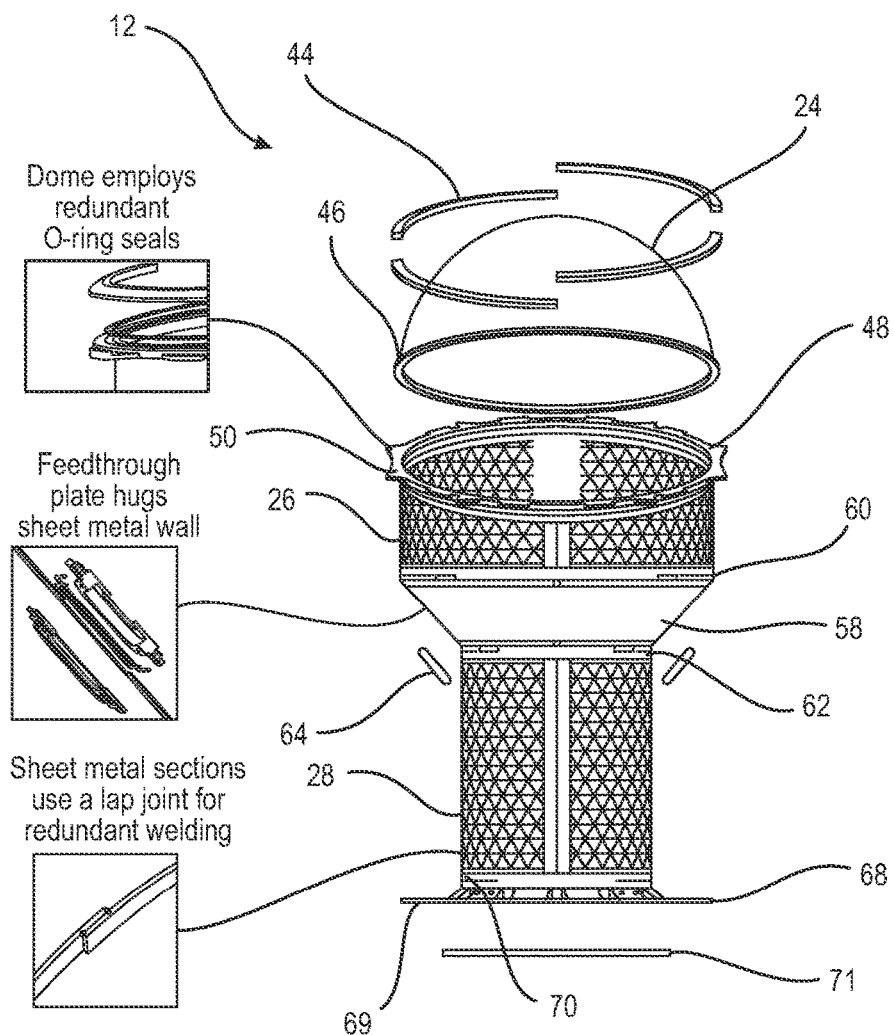
FIG. 4 is an exploded view of the crew enclosure employed in accordance with the present invention.
Figure 13:
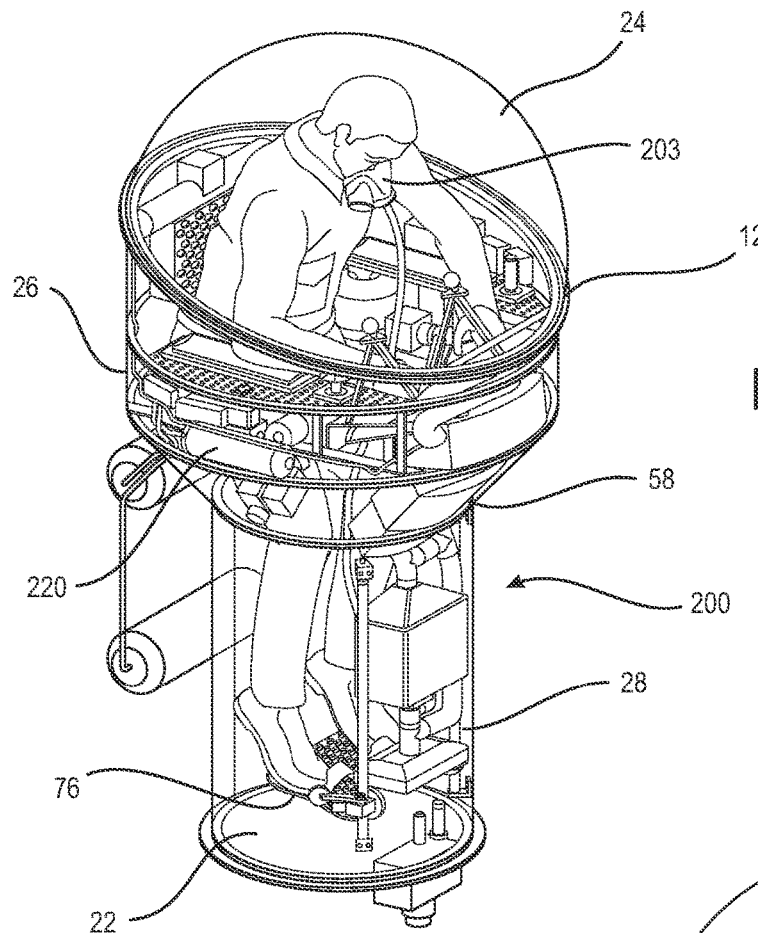
FIG. 13 is a side perspective view showing the internal construction of the crew enclosure.
Figure 14:
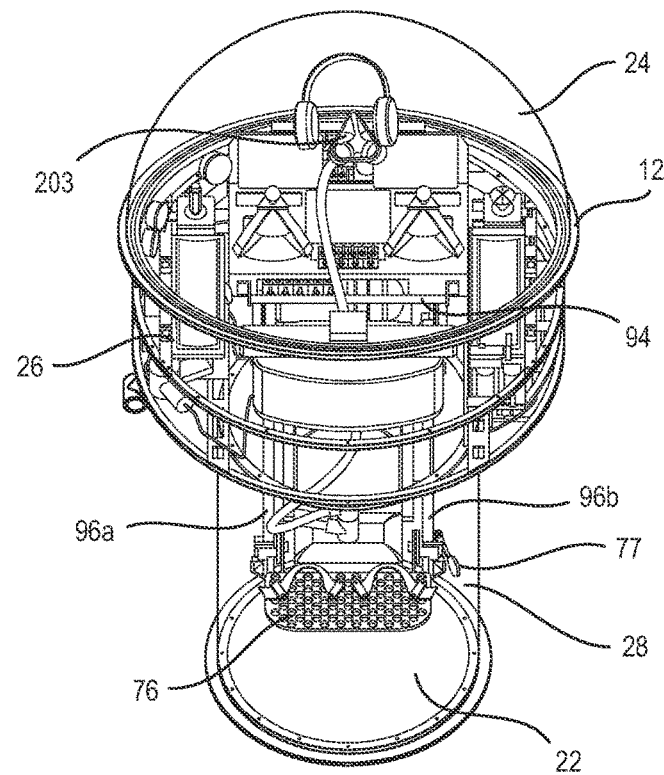
FIG. 14 is a rear perspective view showing the internal structure of the crew enclosure.
Figure 15:
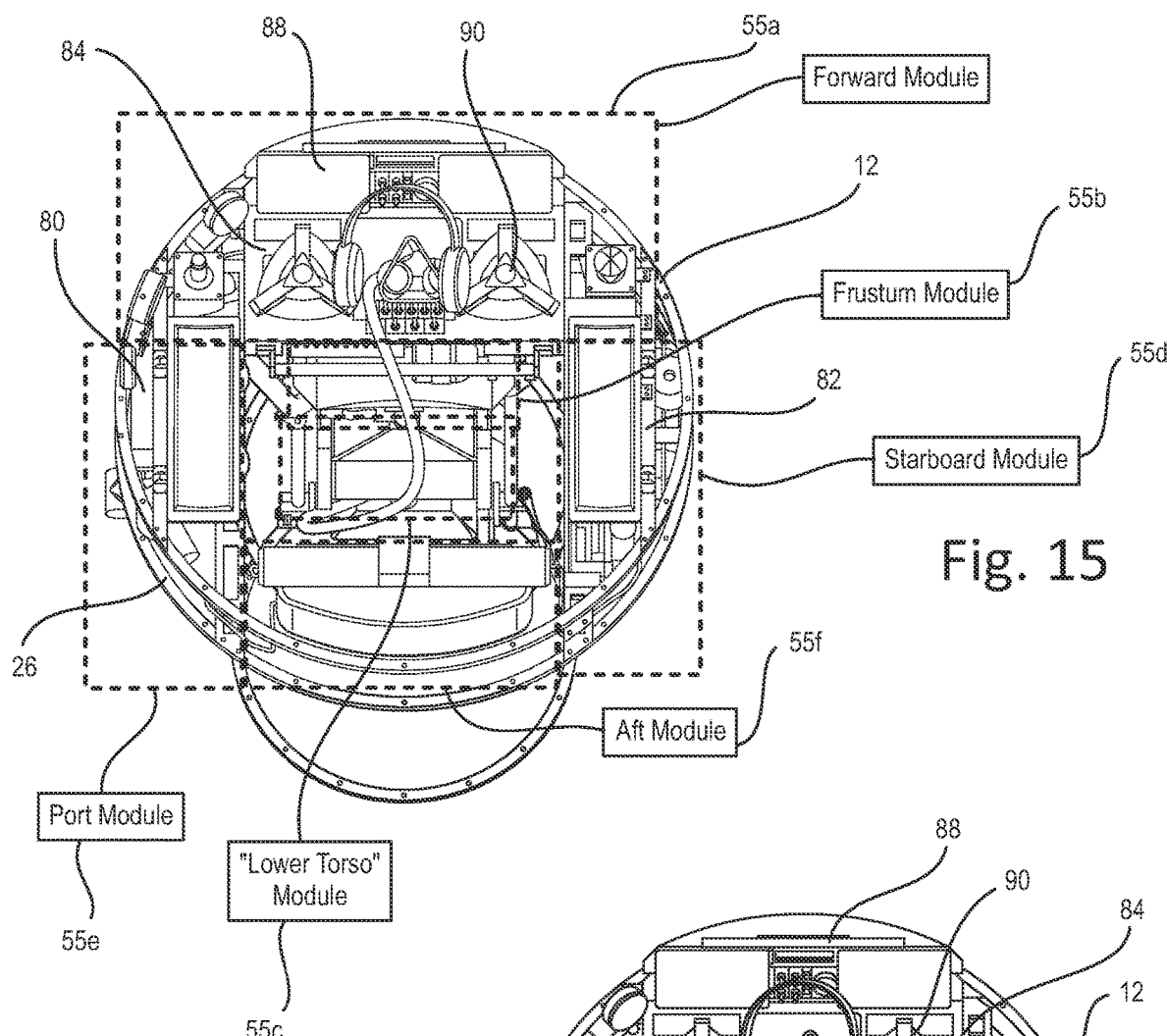
FIG. 15 is a top view showing the internal structure of the crew enclosure.
Figure 16:
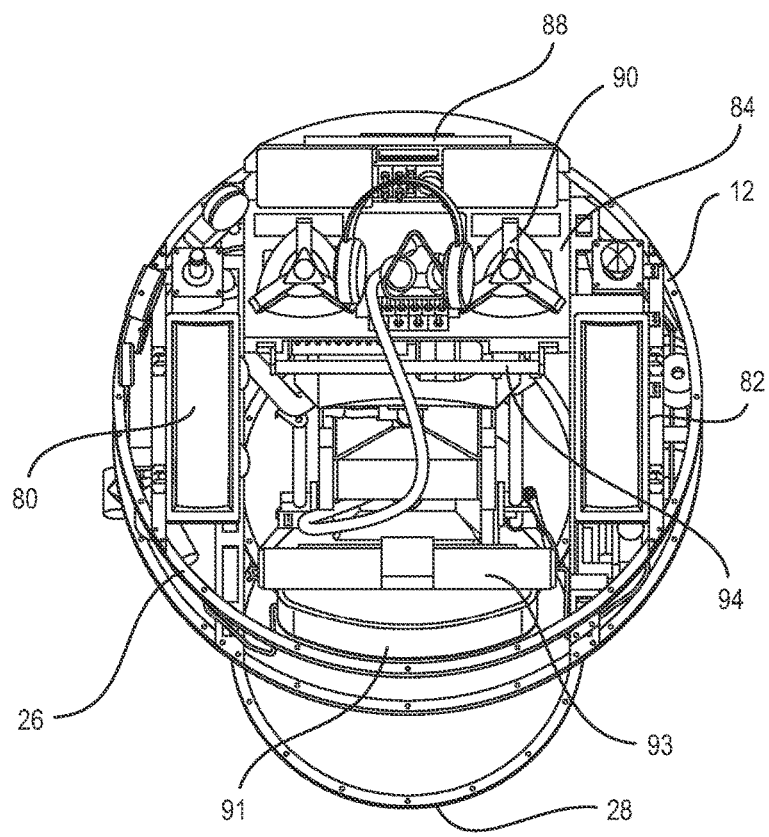
FIG. 16 is a top view showing the internal structure of the crew enclosure.

As the preceding disclosure explains, the structure of the pressurized crew enclosure 12 includes a hemispheric canopy 24 attached to a large diameter upper enclosure member 26 allowing astronaut arm movement and a smaller diameter lower enclosure member 28 with a hatch 22 placed at the end of the smaller diameter lower enclosure member 28 (See FIGS. 4, 13, and 14). Maneuverability of the astronaut within the crew enclosure 12 is facilitated with the provisions of a first horizontal translation bar 94 within the upper enclosure member 26 and first and second vertical translation bars 96a, 96b in the lower enclosure member 28. Through the utilization of the first horizontal translation bar 94 and the first and second vertical translation bars 96a, 96b, astronaut may easily move into and out of the crew enclosure 12. Titanium and/or aluminum have been chosen for use in the construction of many components of the single-person spacecraft because of their superior welding properties. Polycarbonate is used for both the pressure canopy 24 and outer unpressurized protective shielding skin 16 because of its excellent impact resistance and optical qualities. Because of the restricted work space inside the single-person spacecraft 10, the internal structure is divided into three major sections; port and starboard crescents 80, 82 with a flight deck 84 bridging the two. This approach was adopted to allow independent assembly and checkout of subsystem components prior to installation. Each section uses an open aluminum framework to provide access for on-orbit servicing. Furthermore, to provide adequate ventilation across all equipment, the closeout panel 86 is made of perforated aluminum sheet metal.

The external equipment bay 14 is supported by the four vertical longerons 38 that both separate the crew enclosure 12 from the shield skin 16 and provide surface area for mounting external equipment. The crew enclosure 12 and the shield skin 16 are directly secured to the longerons 38 via coupling members. In accordance with a preferred embodiment, the longerons 38 are constructed as aluminum sandwich panels.

The crown assembly 18 serves to protect the canopy 24, house avionics, and provide a support structure for mounting thrusters 30, lights 40 and cameras 42. Additional structure includes two aluminum "golden arches" (that is, the structural rails) that extend over canopy 24 providing bump protection, a mounting structure for the crown assembly 18, and a guide path for three sets of visors, that is, the sun visor 52, the opaque shade 53, and the protective shield 54.

The internal layout of the crew enclosure 12 can essentially be broken into 6 zones, for example, a flight deck module 55*a*, a frustum module 55*b*, a lower torso module 55*c*, a starboard module 55*d*, a port module 55*e*, and an aft module 55*f*. As will be appreciated based upon the following disclosure, the displays 88 and controls 90, the fire extinguisher 230, and the spray bar 204 are found in the flight deck module 55*a*.

With regard to the frustum module 55*b*, it includes the humidity control unit 210 and the trace contaminant removal system 211. The lower torso module 55*c* includes the potassium super oxide cartridges 208, the inlet filter 206. The starboard module 55*d* includes the repressurizing nitric system 224, the supplemental oxygen system 220, and the positive pressure control system 227. The port module 55*e* includes the vacuum vent units 213 and the thermal control system 214. Finally, the aft module 55*f* includes a water tank 91 and the water membrane evaporator 93.

Figure 17:
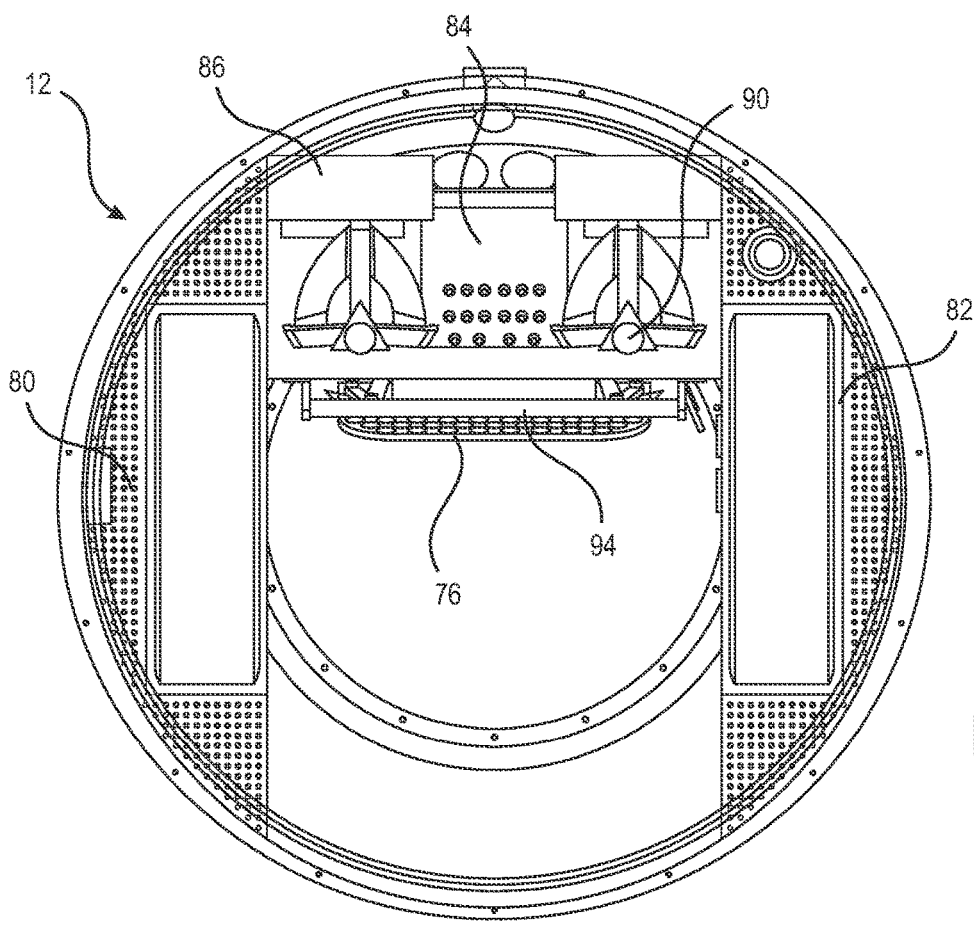
FIG. 17 is a top view of the crew enclosure with all elements removed with the exception of the flight deck, the port crescent, and the starboard.
Figure 18:
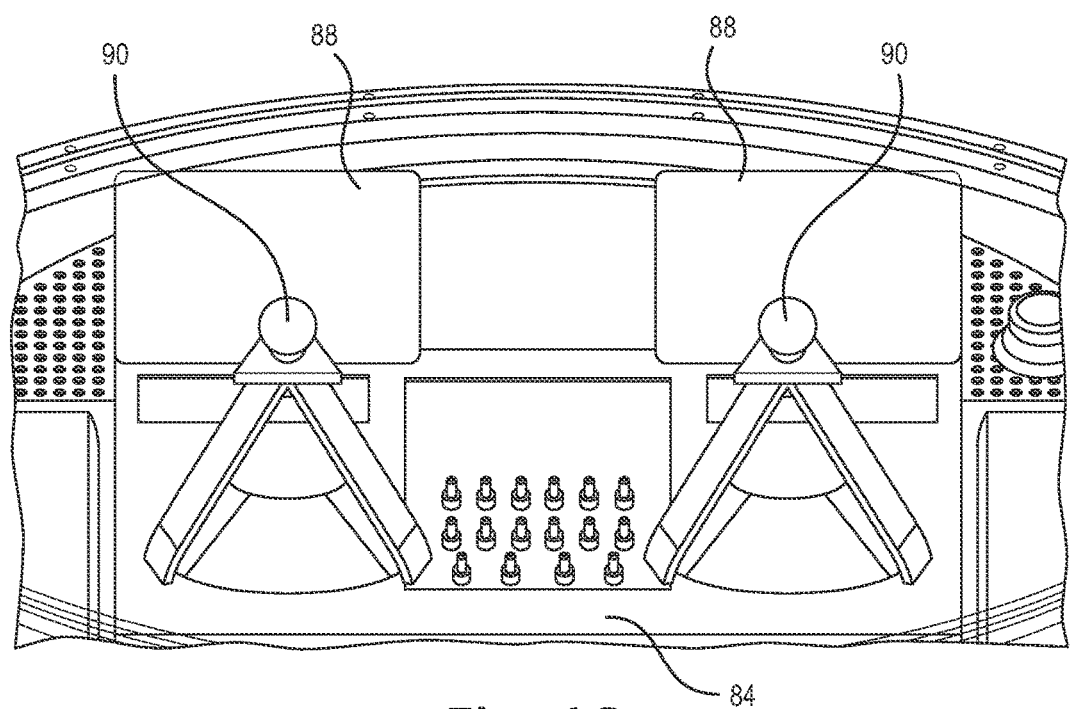
FIG. 18 is a detailed view showing the flight deck.
Figure 19:
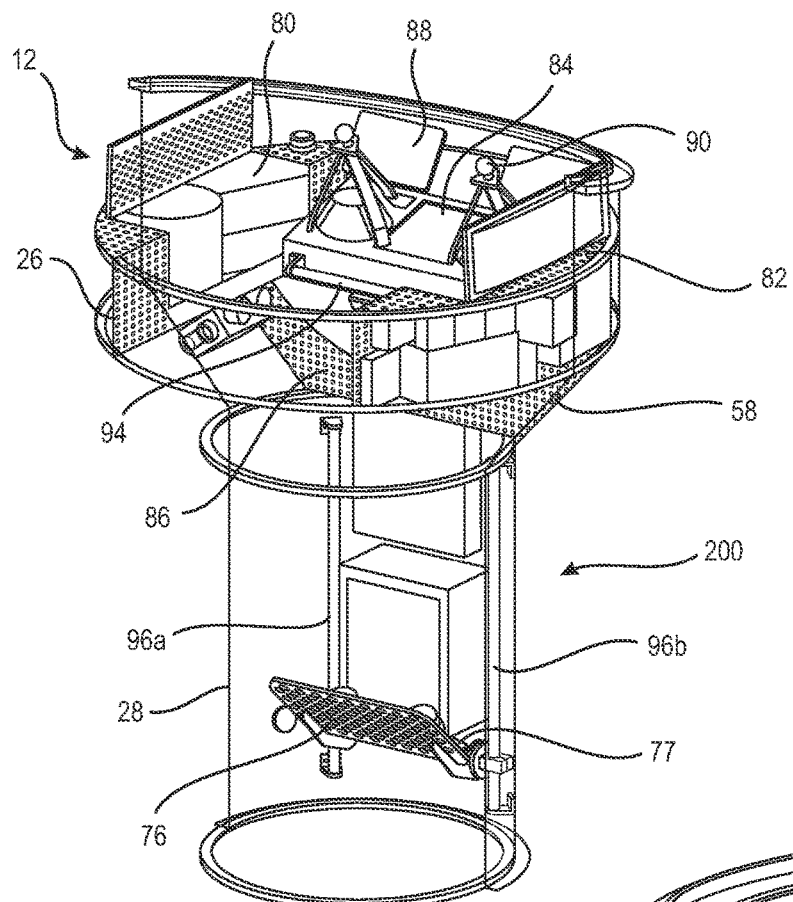
FIG. 19 is a perspective view showing various elements of the internal structure of the crew enclosure.
Figure 20:
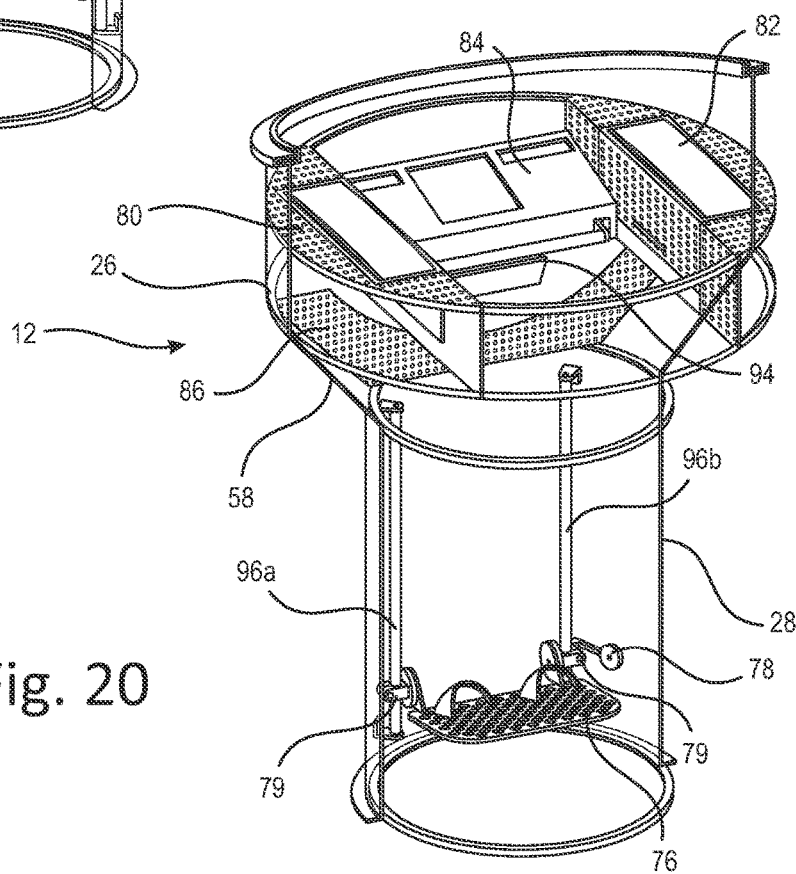
FIG. 20 is a perspective view showing the internal structure of the crew enclosure.
Figures 21, 22:
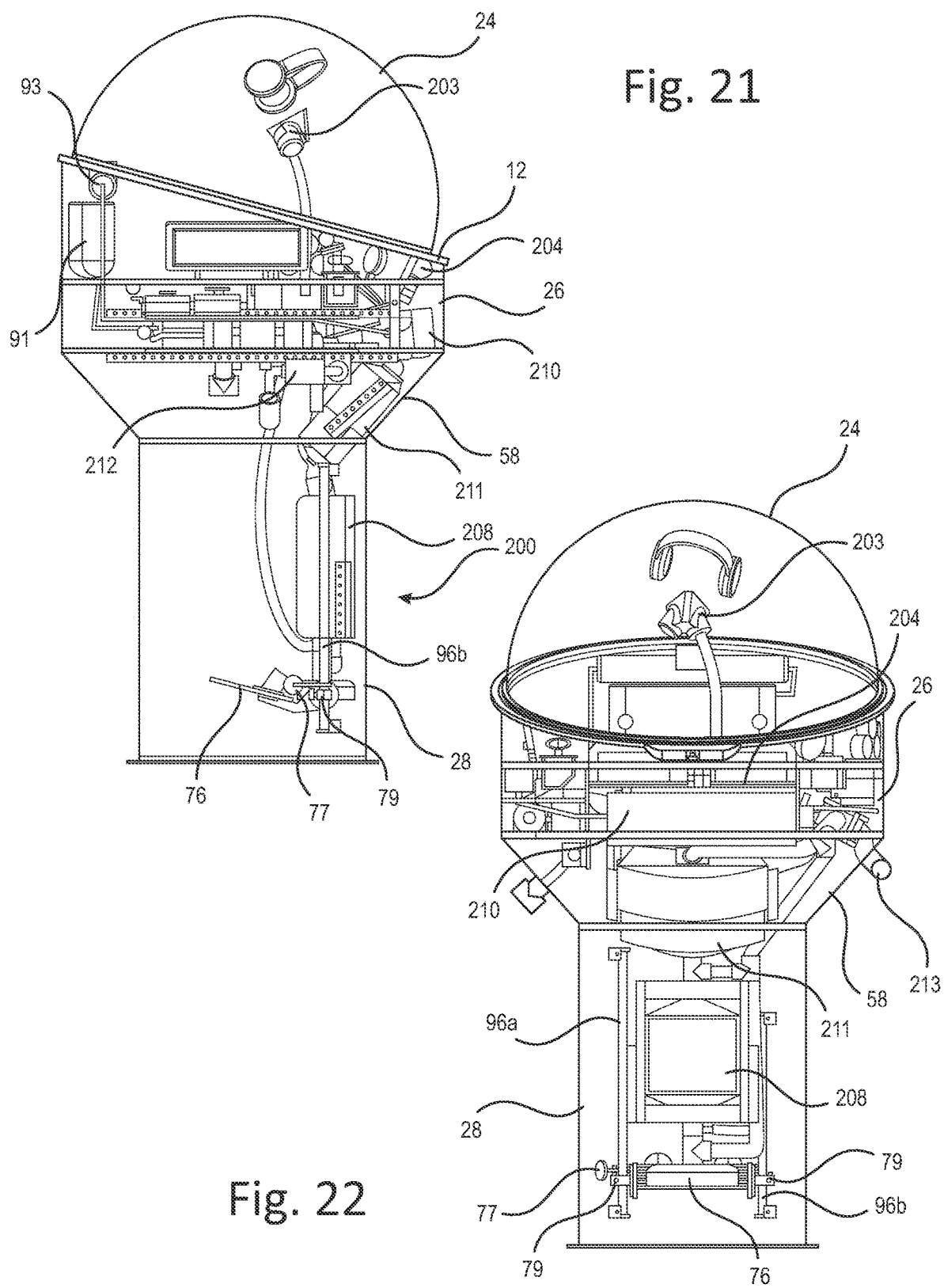
FIGS. 21 and 22 are respectively a side view and a front view of the crew enclosure showing various internal structures, in particular, the air management system.
Figure 23:
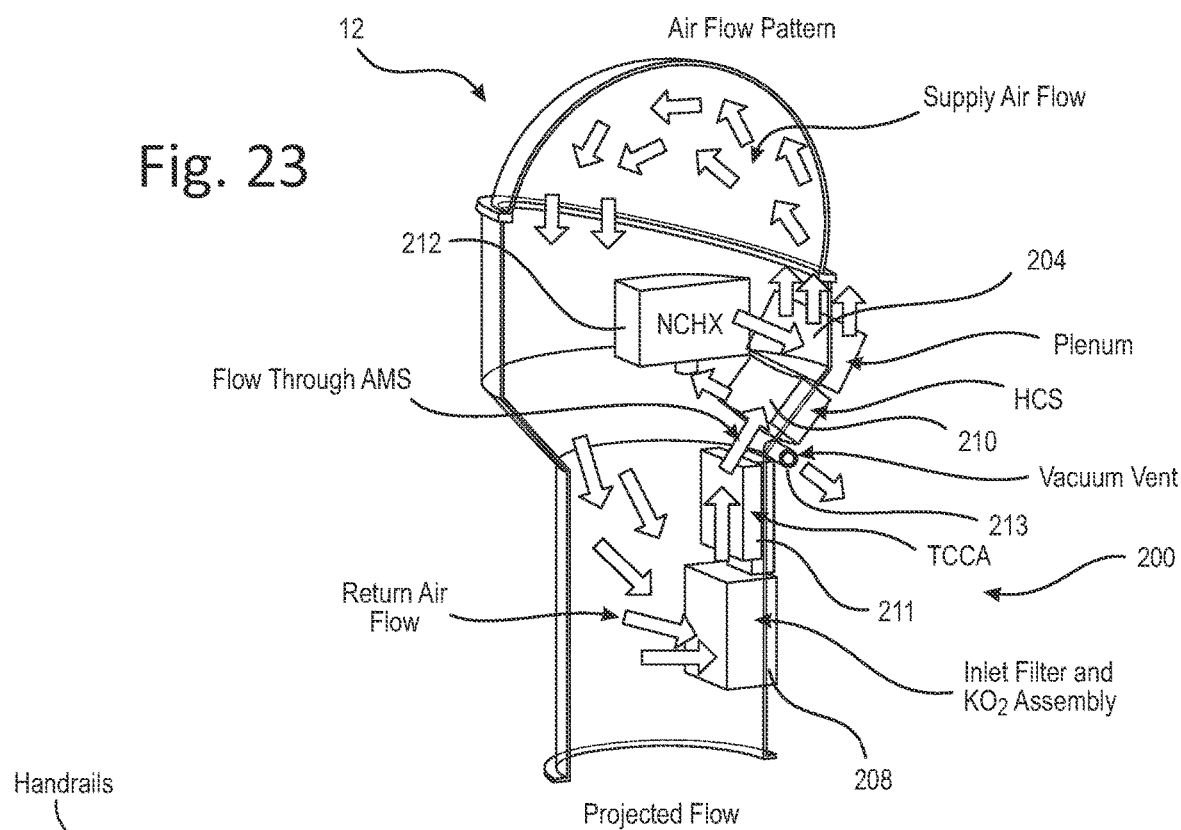
FIG. 23 is a schematic showing the air management system.
Figure 24:
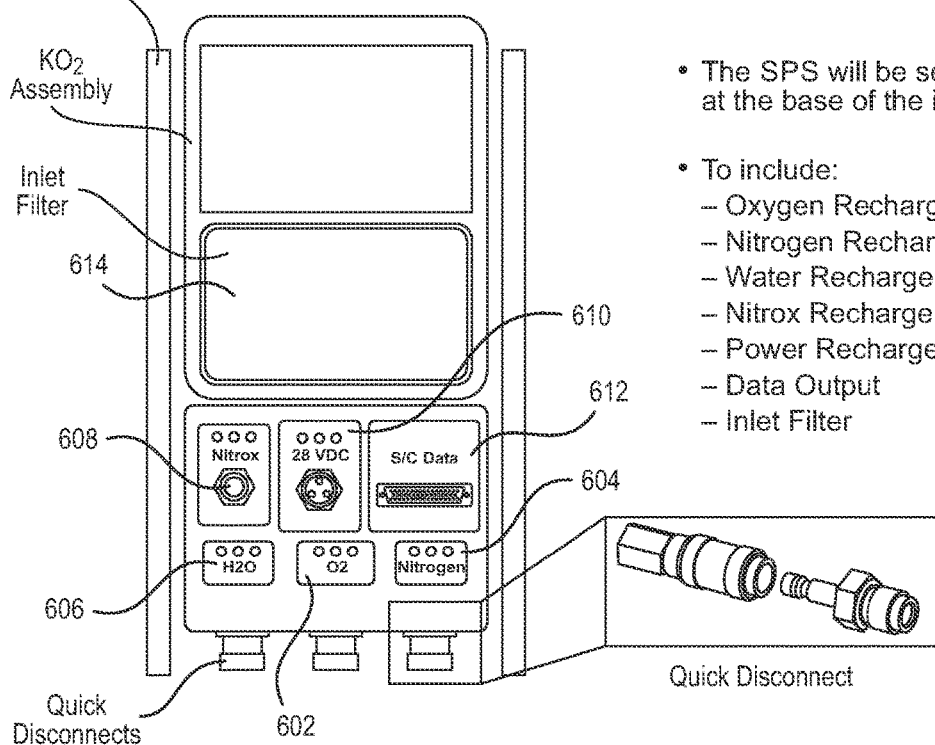
FIG. 24 is a perspective view showing the astronaut service panel.
Figures 25A, 25B, 26:
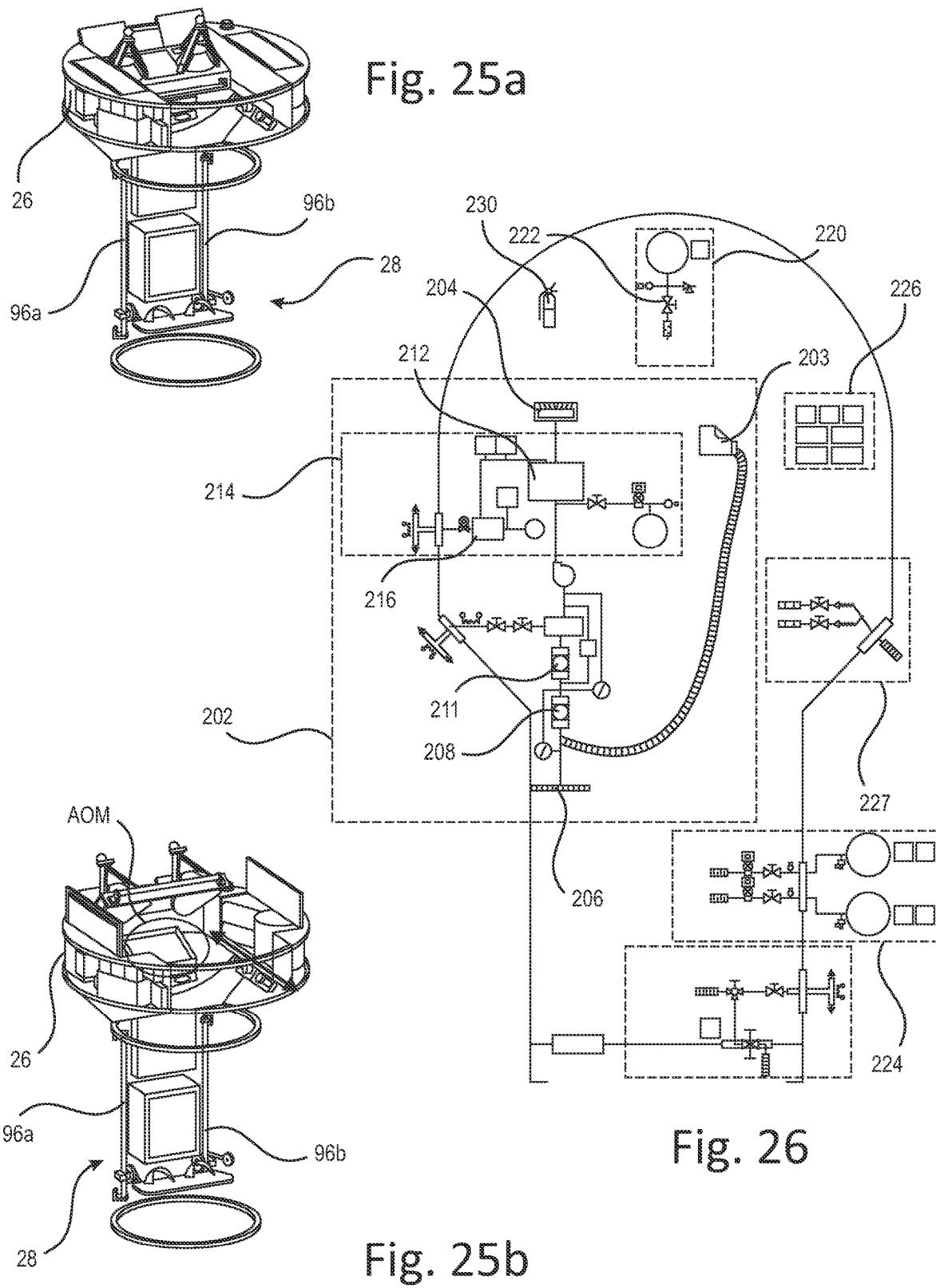
FIGS. 25A and 25B are schematics of the crew enclosure showing the first horizontal translation bar and the first and second vertical translation bars, as well as the provisional of quick access panels within the crew enclosure.
FIGS. 26 and 27 are schematics of the operational elements of the present single person spacecraft.

Passthroughs are located generally in the frustum sheet metal section 58 of the crew enclosure 12 and are facilitated by the provisions of feedthrough plates 64. This provides a natural transition point for routing of various control mechanisms from outside the crew enclosure 12 to inside the crew enclosure 12. A foot restraint 76 is positioned within the lower enclosure member 28 and is structured to be adjustable around the feet of astronauts of various sizes as well as be stowable for ingress/egress. The foot restraint 76 is adjustably mounted on the first and second vertical translation bars 96*a*, 96*b* within the lower enclosure member 28 of the crew enclosure 12 in a manner allowing for up and down movement along the first and second vertical translation bars 96*a*, 96*b* relative to the upper enclosure member 26 so to allow for proper positioning of astronauts of various sizes within the crew enclosure 12, allowing al astronauts regardless of size to make full use of the features offered by the single-person spacecraft 10. Selectively adjustable brackets 79 secure the foot restraint 76 to the first and second vertical translation bars 96*a*, 96*b*. The foot restraint 76 is also structured to allow for selective pivotal movement between a use position (as shown in FIGS. 13, 14, 20, 21, and 22) and a storage position (as shown in FIGS. 17 and 19). This movement is controlled by a foot activated level 77 used to release the foot restraint 76 from its position for movement as desired. As such, and before entering the single-person spacecraft 10, astronauts pre-position the foot restraint 76 to its desired height and rotate the foot restraint to its storage position. Then, once within the crew enclosure 12, the astronaut uses the foot-activated lever 77 to release the foot restraint 76 and allow it to be swung into place for use (as shown in FIGS. 13, 14, 20, 21, and 22). The process is reversed for egress. As will be appreciated based upon the following disclosure, astronaut access to various modules necessary for servicing of the single-person spacecraft is provided from within the crew enclosure 12.

The component of the air management system 200 is generally spread between the flight deck module 55*a*, the frustum module 55*b*, and to lower torso module 55*c* along the forward portion of the crew enclosure 12 in the lower enclosure member 28. This is believed to optimize air flow and improve ingress. In accordance with a preferred embodiment, and as discussed below in more detail, ventilation originates at a spray bar 204 located at the base of the canopy 24, that is, at the junction of the canopy 24 and the upper edge 48 of the upper enclosure member 26, at the flight deck module 55*a* along the forward portion of the crew enclosure 12. The spray bar 204 blows air upwardly such that the air flow washes the dome defined by the canopy 24 like an automobile defroster. Air moves up the canopy 24 over the astronauts' head collecting cabin $CO_2$ and condensation then down to an inlet filter 206 located in the lower enclosure member 28, that is, at the lower torso module 55*c* along the forward portion of the crew enclosure 12. Positioning in of the inlet filter 206 as described above, provides astronauts with ready access thereto in the event servicing is required. After the filter, air passes through replaceable potassium superoxide cartridges 208 for $CO_2$ removal, then through a trace contaminant removal system 211 and humidity control unit 210 which includes a non-condensing heat exchanger 212 (all of the which are located at a lower center position along the forward portion of the crew enclosure 12), and finally back out into the crew enclosure 12.

Finally, the upper enclosure member 26 is large and the lower enclosure member 28 is small. These relative sizes result from the fact astronauts require more space in the upper enclosure member 26 to allow for arm and head movement, while the lower enclosure member 28 may be smaller due to limited need for the use of the astronauts' the legs. The upper enclosure member 26 is provided with displays 88 and controls 90 (primarily at the flight deck module 55*a*), and offers the astronaut a direct line of site via the canopy 24. With reference to FIGS. 13-18, the controls 90 of the upper enclosure member 26 include flight control zones 1 and 2, manipulator controllers, switches, dials, buttons, and manual valve controls.

The single-person spacecraft 10 further includes manipulator arms 98 extending therefrom. In accordance with a disclosed embodiment, there are first and second manipulator arms 98 extending from the forward side of the crew enclosure 12. The manipulator arms 98 are secured to and supported by respective longerons 38. As known to those skilled in the art, the manipulator arms 98 move in multiple planes and various known manipulator arm structures may be used in accordance with the present invention. Various options are available for the controllers for the externally extending manipulator arms 98. The controllers may take the form of dual controls for rotation and translation, a single stick control, translation via a switch, and/or a single multiple-function control.

As briefly discussed above, the requirements for the final positioning of the thrusters 30 about the single-person spacecraft 10 are a function of various design factors associated with the single-person spacecraft and will be determined based upon calculations well known to those skilled in the art. In addition, various control mechanisms may be employed for the thrusters 30. For example, a continuous controller provides a continual control input to causing the thrusters to continually fire. This offers the most control authority to the astronaut, but it is difficult to track inputs in order to bring the single-person spacecraft 10 to a halt and can lead to over control, quickly expending the limited fuel supply. A pulse controller may also be used. A pulse controller provides control inputs resulting in the thruster(s) firing for a set interval. Control inputs of a pulse controller can effectively be "logged" to help bring the single-person spacecraft 10 to a stop and, thereby, encourage sparing use of propellant. However, this reduces control authority as pulses useful for fine maneuvering may be tedious for long distance translation. With these considerations in mind, a computer assisted pulsed thruster controller is preferred.

Figure 27:
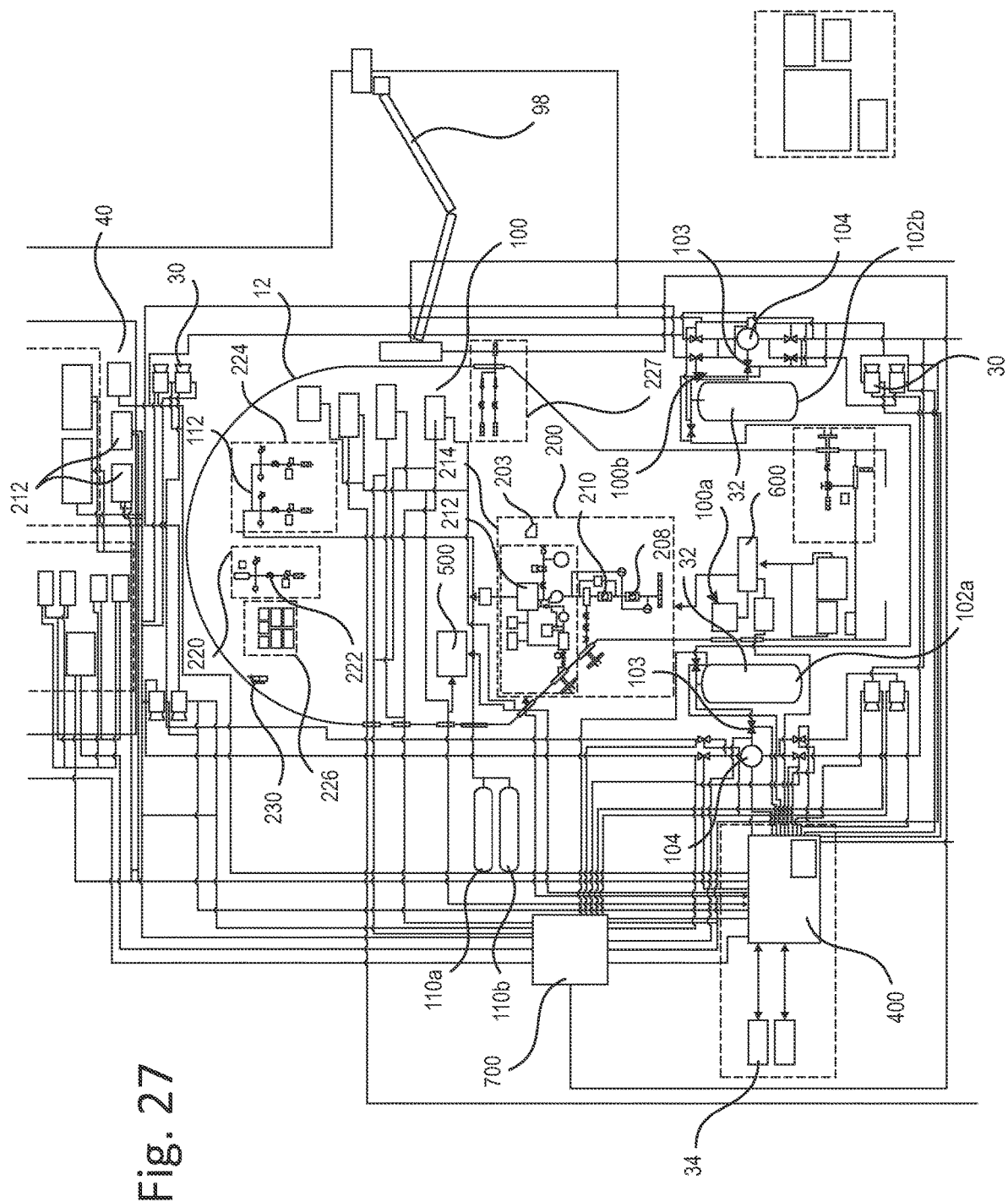

The single-person spacecraft 10 uses a known cold gas propulsion system 100, that is, the propulsion system in accordance with the present invention is based upon the flight proven, human-rated Manned Maneuvering Unit (MMU), (see FIG. 27). This propulsion system 100 stresses reliability, safety, and ease of use. In practice, propulsion loads are a maximum of 2 lbs. in any combination of the various thrusters 30 as shown in FIG. 27.

The propellant is compressed nitrogen which is neither a toxic nor combustible, and is easily refilled on orbit using existing space-rated pumps. The propellant is stored at 3000 psi in two commercially available tanks 102a, 102b then stepped down to the thruster valve 103 operating pressure through regulators 104 downstream of cutoff valves 106. The system 100 is comprised of identical halves 100a, 100b, each fueled by one of the two tanks 102a, 102b on the single-person spacecraft 10. The halves 100a, 100b are functionally symmetric. When the system 100 is functioning, both halves of the system 100a, 100b will expend the same amount of fuel. If a tank or pressure regulator fails, the single-person spacecraft 10 can be fully controlled by a single half of the propulsion system 100. Like the MMU, the single-person spacecraft 10 includes an attitude hold capability (known to those skilled in the art) enabling the orientation to be held without having to use the hand controllers.

The single-person spacecraft 10 includes a safety feature that takes advantage of the emergency Nitrogen-Oxygen (Nitrox) repressurization gas as propellant. If there is a breach in the crew enclosure 12, two nitrox tanks 110a, 110b are used to feed-the-leak. However, if there is no breach and the emergency calls for more propellant, valves 112 can be opened allowing the Nitrox to be used as get home propellant.

As briefly mentioned above, the single-person spacecraft 10 includes air management system 200 (see FIGS. 19, 21-23, 26, and 27). Single-person spacecraft 10 excursions are less than 8 hours, thus only an air management system 200 versus a complete Environmental Control Life Support System (ECLSS), is required. The crew enclosure 12 is designed for earth-like, sea-level (14.7 psi, 80% N2, 20% O2) atmosphere, eliminating the need for the standard extra vehicular activity pre-breathe without the risk of decompression sickness (the bends).

The air management system 200 includes an air revitalization system 202, a thermal control system 214, a supplemental oxygen system 220, a re-pressurizing nitrox system 224, an instrumentation system 226, and positive pressure control system 227.

The air revitalization system 202 is the core of the air management system 200 providing overall ventilation, $CO_2$ removal and humidity control. Unlike the strenuous workout associated with suited extra vehicular activity, operating the single-person spacecraft 10 is be more like flying a commercial aircraft thus there is no need for the liquid cooling ventilation garment. With a reduced metabolic load, there is less crew-produced water vapor, but, as a precaution, the initial flights include an oral-nasal mask 203 to minimize cabin condensation and $CO_2$. With regard to circulation of air as produced in accordance with the present invention, this has been discussed above.

The single-person spacecraft 10 thermal control system 214 regulates the internal air temperature of the crew enclosure 14. The air flow is designed to collect crew and equipment heat passing through the heat exchanger 212 to condition the interior of the crew enclosure 12 to a design set point of 70 degrees F., however this is controllable by the crew member. A water membrane evaporator 216, like the ones in the current space suits, takes water from the heat exchanger 212, cools it through exposure to the vacuum sending it back in a loop to the heat exchanger 212.

The supplemental oxygen system 220 acts as both an additive as well as an emergency oxygen supply. If the oxygen levels in the air management system 200 are low, valves 222 open to release oxygen into the crew enclosure 12. If the air revitalization system 202 fails, the supplemental oxygen could provide enough oxygen to allow approximately 7 hours of contingency oxygen, more than enough time for the astronaut to return to the host spacecraft.

Rapid depressurization is an important concern for any spacecraft. If the single-person spacecraft 10 experiences a leak, the re-pressurizing nitrox system 224 will activate, allowing air into the interior of the crew enclosure 12 to maintain pressure and support life. The re-pressurizing nitrox system 224 is sized to provide for 30 minutes of breathable air in the event of a 0.25 inch sized hole being formed in the crew enclosure 12.

During flight, it is important to know the status of the environment in order to determine and check overall flight safety. The instrumentation system 226 is essentially all of the sensors and gauges that output for display pressure, temperature, trace contaminates, and humidity.

The positive pressure control system 228 prevents over pressurization within the enclosure.

Because the single-person spacecraft 10 has the same atmospheric gas composition as the International Space Station, the risk of fire is less than a pure oxygen space suit. Regardless, the single-person spacecraft 10 is equipped with a hand held water mist fire extinguisher 230 which allows fire suppression without contaminating the air within the interior of the crew enclosure 12.

The single-person spacecraft 10 electrical system 300 (FIG. 27) is powered by 2 Lithium ion 100 Amp hour batteries 34 designed to operate for an 8 hour mission per battery. The power distribution contains 2 parallel interface connectors providing primary and redundant paths for all loads.

The power distribution unit (PDU) 400 is fully cross strapped so that either battery 34 can power any primary or redundant load. Load switching is done by high reliability, space qualified relays controlled by TTL (transistor-transistor logic) signals from the main computer. Relay position and load currents are monitored and reported as part of the power distribution unit 400 housekeeping telemetry. The power distribution unit 400 interfaces not only with each battery 34 and all loads but also a circuit protection panel 500 and astronaut service panel 600.

Wiring and current protection are sized to each particular load. The astronaut service panel 600 is used to provide an internal accessible panel for charging, controlling external power or switching battery busses. Diodes and switches are used to isolate internal and external power as well as charging operations. The circuit protection panel 500 provides the astronaut with a visible indication of circuit status including a current over load or "tripped" state.

At the heart of the single-person spacecraft 10 is the Genesis Engineering Solution's GEN6000 data processing system 700. GEN6000 data processing system 700 offers both speed and versatility. The data processing system 700 can step outside of typical roles such as command and data handling, and guidance and navigation control, and take on more computationally demanding tasks such as image processing.

On the single-person spacecraft 10, GEN6000 data processing system 700 will be employed to accomplish flight control, robotics operation and processing relevant to the air management system 200. GEN6000 data processing system 700 is a product of Genesis Engineering Solutions.

The single-person spacecraft 10 offers better protection than space suits. For LEO (Low Earth Orbit) operations, the shielding skin 16 of the single-person spacecraft 10, when coupled with multi-layer insulation (not shown), attenuates the impact energy from debris and micrometeoroids. This solution is designed for the LEO environment and, therefore, assumed acceptable for Beyond Earth Orbit (BEO) operations where debris hazards do not exist. No additional radiation protection is required for LEO but for BEO, two layers of protection are available. A first polyethylene outer layer 800 is used to surround the single-person spacecraft 10 and a second layer provided by a wearable radiation jacket (not shown).

The single-person spacecraft 10 is serviced via astronaut service panel 600 at the base of the internal structure of the crew enclosure 12 in the lower enclosure member 28 at a lower center position along the forward portion of the crew enclosure 12. The service panel 600 includes inputs/outputs for servicing oxygen recharge 602, nitrogen recharge 604, water recharge 606, nitrox recharge 608, power recharge 610, data output 612, and inlet filter 614. Still further, the crew enclosure 12 is designed for access to all components, aims for single layer packaging, and provides that components with high probability failure or that require access in case of an emergency, shall be placed in the open within reach beneath quick access panels.

While details of certain embodiments of the present inventions are described, they are provided as illustrative examples so as to enable those of ordinary skill in the art to practice the inventions. The details provided are not meant to limit the scope of the present inventions, but to be exemplary.

The invention claimed is:

1. A single-person spacecraft, comprising:
    a pressurized crew enclosure comprising a large diameter upper enclosure member allowing arm movement and a smaller diameter lower enclosure member, the smaller diameter lower enclosure member comprising a foot restraint and at least one translation bar for crew translation into and out of the pressurized crew enclosure, wherein the foot restraint is adjustably mounted on the at least one translation bar in a manner allowing for up and down movement along the at least one translation bar relative to the upper enclosure member so to allow for proper positioning of astronauts of various sizes within the pressurized crew enclosure,
    an external equipment bay, wherein the upper enclosure member is secured to the lower enclosure member via a frustum sheet metal section extending between a lower edge of the upper enclosure member and an upper edge of the lower enclosure member and feed-through plates are formed along the frustum sheet metal section to provide access points for communicating between the pressurized crew enclosure and the external equipment bay, and
    an overhead crown assembly,
    wherein an air management system is provided in the pressurized crew enclosure, the air management system comprises at a spray bar located at a forward portion of the pressurized crew enclosure such that the spray bar blows air upwardly such that air flow washes a dome defined by a canopy and flows over an astronauts' head collecting cabin $CO_2$ and condensation down to an inlet filter located in the lower enclosure member along the forward portion of the crew enclosure.

2. The single-person spacecraft according to claim 1, further comprising a shielding skin, wherein space between the shielding skin and the pressurized crew enclosure defines the external equipment bay which is an unpressurized annular volume within which various subsystems of the single-person spacecraft are housed.

3. The single-person spacecraft according to claim 1, further comprising a docking mechanism and a hatch.

4. The single-person spacecraft according to claim 1, wherein the pressurized crew enclosure further includes a clear hemispheric canopy.

5. The single-person spacecraft according to claim 4, wherein the clear hemispheric canopy comprises a sun visor, an opaque shade, and a protective shield.

6. The single-person spacecraft according to claim 1, wherein the pressurized crew enclosure comprises a first horizontal translation bar within the upper enclosure member and the at least one translation bar comprises first and second vertical translation bars in the lower enclosure member.

7. The single-person spacecraft according to claim 1, wherein the foot restraint further comprises a foot activated lever used to release the foot restraint for movement between a storage position and a use position, wherein, and before entering the single-person spacecraft, astronauts pre-position the foot restraint to its desired height and rotate the foot restraint to its storage position and then, once within the crew enclosure, the astronaut uses the foot activated lever to release the foot restraint and allow it to be swung into place for use.

8. The single-person spacecraft according to claim 1, wherein the pressurized crew enclosure is supported by panel longerons providing primary load path for loads applied to the single-person spacecraft.

9. The single-person spacecraft according to claim 8, further comprising thrusters, propellant tanks, batteries, and a multifunctional drawer connected to, and stabilized by, the panel longerons.

10. The single-person spacecraft according to claim 1, wherein the crown assembly is secured to structural rails that arch over the pressurized crew enclosure.

11. The single-person spacecraft according to claim 1, wherein the crown assembly supports propulsion thrusters, lights and cameras.

12. The single-person spacecraft according to claim 1, further including a data processing system, the data processing system providing for flight control, robotics operation and processing relevant to the air management system.

13. The single-person spacecraft according to claim 1, further comprising a service panel within the pressurized crew enclosure.

14. The single-person spacecraft according to claim 13, wherein the service panel comprises inputs/outputs for servicing oxygen recharge, nitrogen recharge, water recharge, nitrox recharge, power recharge, data output, and inlet filter.

* * * * *